United States Patent [19]

Ravnkilde et al.

[11] 4,069,362
[45] Jan. 17, 1978

[54] CORE MATERIAL FOR BUILDING ELEMENTS OF SANDWICH TYPE

[75] Inventors: Jorgen Flemming Ravnkilde, Hornbaek; Ivar Ostrup, Farum, both of Denmark

[73] Assignee: Rockwool International A/S, Hedehusene, Denmark

[21] Appl. No.: 730,497

[22] Filed: Oct. 7, 1976

[30] Foreign Application Priority Data

Oct. 14, 1975 Denmark .............................. 4598/75

[51] Int. Cl.$^2$ .............................................. B32B 3/02
[52] U.S. Cl. .................................. 428/194; 428/213; 428/284; 428/285
[58] Field of Search ............... 428/192, 194, 195, 198, 428/201, 212, 213, 282, 284, 304, 305, 317, 320, 322, 285; 52/404, 406, 407

[56] References Cited

U.S. PATENT DOCUMENTS

| | | | |
|---|---|---|---|
| 1,551,994 | 9/1925 | Latimer | 52/404 |
| 3,115,948 | 12/1963 | Gildard et al. | 428/317 |
| 3,222,243 | 12/1965 | Gaston et al. | 428/212 |
| 3,283,849 | 11/1966 | Schirick et al. | 428/212 |
| 3,336,709 | 8/1967 | Berney et al. | 52/407 |
| 3,509,963 | 5/1970 | Deplante | 428/320 |
| 3,712,846 | 1/1973 | Daniels et al. | 428/212 |
| 3,867,241 | 2/1975 | Haglund | 428/284 |
| 3,968,281 | 7/1976 | Erickson | 428/284 |

*Primary Examiner*—James J. Bell
*Attorney, Agent, or Firm*—Lawrence Rosen; E. Janet Berry

[57] ABSTRACT

Core material for use in building elements in which the interspace between the outer layers is filled up with a porous material comprising at least two layers which are interconnected on a minor part of their surfaces facing each other, preferably by glueing. According to the invention the core material consists of two layers of bonded mineral wool the surfaces of which are touching each other, the interconnection being along the edges. The core material reduces sound transmission without substantially reducing mechanical strength.

1 Claim, 1 Drawing Figure

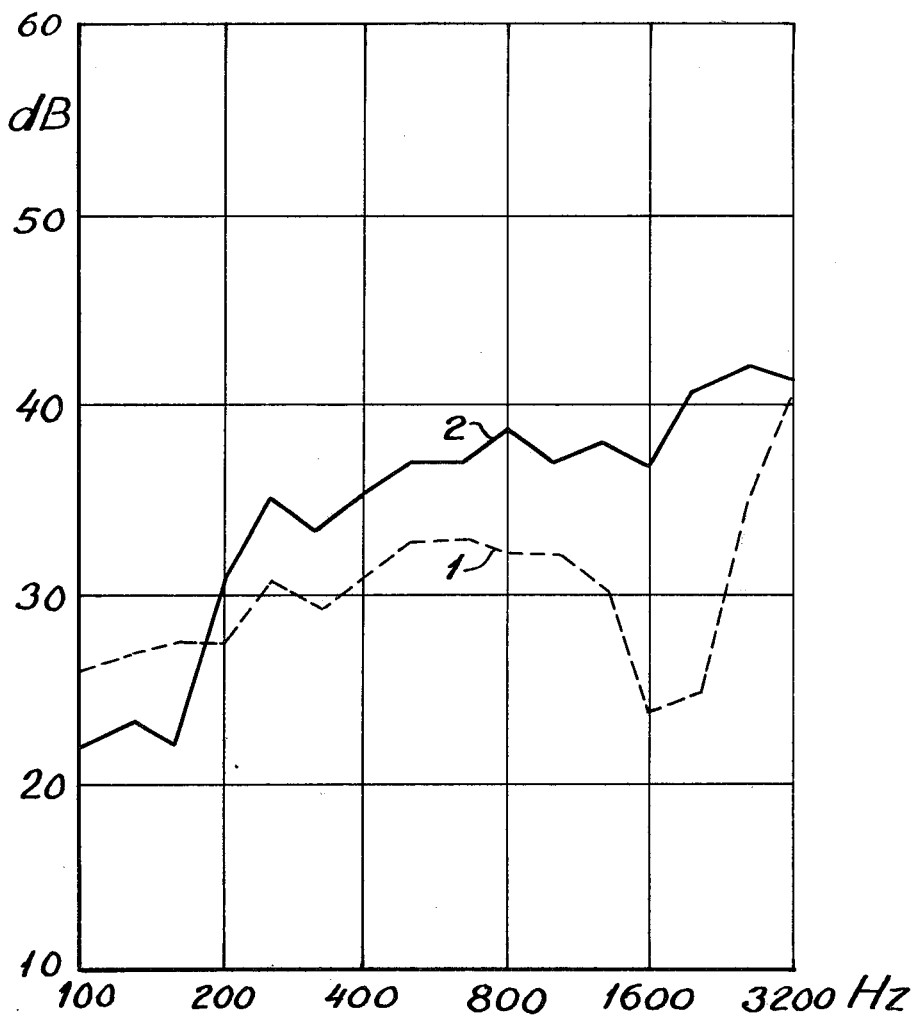

CORE MATERIAL FOR BUILDING ELEMENTS OF SANDWICH TYPE

Walling elements of sandwich type are used in light wallings of removable type in office houses, in bulkheads in railway cars and in ship accomodations as linings or bulkheads. Such elements comprise a core of light, porous and rigid material with a certain thickness and two relatively much thinner outer boards consisting of a material of greater mechanical resistance and being fastened to the core by glueing. The outer boards form wall- and bulkhead surfaces in the rooms, being separated by the walling or bulkhead. Core material is on the market without outer boards and is provided with such boards by the contractor or at the shipyard. The invention relates to a core material of this type.

It is desirable that the walling- and bulkhead elements are relatively thin in order to obtain greater floor area or in order to provide more rooms or cabins within a given area. It is further necessary that the elements are sufficiently stiff to resist the forces from fixing of edges or other forces to which bulkheads or walling are subjected in use. Walling of sandwich type is inherently stiff as even moderate compression forces in one of the outer boards and tensile forces in the other sheet are able to balance considerable forces perpendicular to the elements. The compression or shear forces transferred through the core material are very modest under such circumstances.

A light, porous and stiff material being used for this purpose is mineral wool in form of throughout the thickness uniform and continuous layers, the fibres of the mineral wool being bonded together at their intersections, f.ex. a mineral wool with a density of 300 kg/m$^3$, and a content of bonding agent of 3 percent by weight. With 0.7 mm steel sheets as outer boards the above mentioned core material will form suitable walling- or bulkhead elements which at a thickness of at least 30 mm will possess sufficient stiffness.

However, walls and bulkheads constructed from these elements and having a handy size are unsatisfactory with respect to reduction in transmitted sound. The transmission of sound energy from the air on one side to the air on the other side of the elements mainly takes place by conversion into vibrations in the elements. The sound will be transferred into vibrations in the elements with the resonance frequency of the elements as freely suspended plates, as the fastening means for elements are normally of a light construction. Especially sounds of frequencies in the range of the lowest resonance frequencies are transmitted through the wall with a comparatively low dampening or reduction to the neighbouring room.

Core materials comprising two layers of bonded mineral wool being connected by means of distance pieces with outer sheets on the outside surfaces, and being held in some distance by means of the distance pieces in order to provide an interspace between the layers of mineral wool, have been proposed. The interspace has proved to reduce the sound transmission considerably. However, such known core material is not suitable for transferring compression forces or shear tensions between the outer sheets of the elements. Such elements, therefore, do not have the advantages of the sandwich elements and must, therefore, be of greater thickness in order to resist bending.

The core material according to the present invention comprises two layers of mineral wool which, however, are touching each other on the total area of the surfaces facing one another, and they are only interconnected on part of these surfaces, namely along the edges e.g. by glueing. The two layers may f.ex. be produced by splitting a single layer by means of a band-saw, and afterwards the parts are interconnected as described to form the core material according to the invention, and with the cut faces touching each other. Sandwich elements manufactured from a core material as described have proved to reduce sound transmission compared to nonsplitted elements with continuous layers of mineral wool of the same thickness, density and content of bonding agent as those from which the core material according to the invention was manufactured, but substantially without losing the ability to resist bending.

The band saw leaves the cut somewhat uneven and torn. This is supposed to be important in order to obtain the said advantages. The invention is namely based on the recognition that deflections within safe limits due to outside mechanical forces are still greater than the amplitudes of the flexing caused by sound transmission. Greater forces are transferred between the two layers via the surfaces of the cut and, therefore, more porous area by which the two layers are in contact, and the shear forces are absorbed by the interconnection at the edges. Elements with core material according to the invention, therefore, act as solid elements of the sandwich type in relation to forces from fixing or other forces. At the same time the porous area permits each of the two layers to flex with an amplitude of size corresponding to transmission of sound substantially independent of the other layer and with a much lower resonance frequency. The lowest oscillation frequency of the elements with regard to bending of elements with core material according to the invention compared with sandwich elements with a single layer core material has been brought into a range of frequencies in which sound transmission is better tolerated.

On the other hand, some of the harmonic oscillation frequences of the element may fall within the range of frequences in which sound transmission is less acceptable. It is, therefore, preferable that the two layers are of different thickness. Oscillations in one layer with its outer sheet are then less liable to be transferred from one layer to the other by resonance. The transmission of sound in the range of high frequences is, therefore, reduced.

Instead of splitting, the required unevenness of the two surfaces of mineral wool may be obtained in other ways. After the hardening which finishes the manufacturing process of bonded mineral wool, the outer surfaces of the finished sheets may serve the same purpose.

EXAMPLE

Two partition walls, Nos. 1 and 2, each having an area totalling 10.40 m$^2$ were constructed by joining together elements, each having a width of 0.60 m. The core material in the elements of wall No. 1 was a single layer of bonded mineral wool with a density of 300 kg/m$^3$, containing 3 percent bonding agent by weight, and in wall No. 2 the core material according to the invention consisted of two layers of bonded mineral wool of the same density and with the same content of bonding agent. The outer boards of the elements in both cases were 0.7 mm steel sheeting. The thickness including the outer steel sheets on both sides was 30 mm.

The walls were examined for sound transmission according to DS/ISO/R 140. Measurements for wall No. 1 showed LAB $I_a$ = 27 decibel, and for wall No. 2 LAB $I_a$ = 38 decibel.

In the FIGURE values of reduction are shown as a function of the frequency of the transmitted sound. Wall No. 2 has lower values of reduction at frequences below 200 Hz which means that the resonance frequency of the element has moved to a lower range owing to use of the core material according to the invention. Sound transmission in this range of frequences is, however, considered to be less disturbing than higher frequences.

We claim:

1. In core material useful as filler material between outer boards in sandwich-type building elements for walling or bulkheads, said core material being used to fill interspace between the outer boards of said sandwich-type building elements, the improvement which comprises utilizing as the core material at least two separate layers of bonded mineral wool with surfaces that face and touch each other but are only connected to each other by gluing along edges of said surfaces wherein said separate layers of bonded mineral wool have different thicknesses.

* * * * *